(12) United States Patent
Dielacher et al.

(10) Patent No.: US 9,948,876 B2
(45) Date of Patent: *Apr. 17, 2018

(54) CHARGE CONSERVATION IN PIXELS

(71) Applicant: Infineon Technologies AG, Neubiberg (DE)

(72) Inventors: Markus Dielacher, Graz (AT); Martin Flatscher, Graz (AT); Josef Prainsack, Graz (AT); Franz Darrer, Graz (AT); Michael Mark, Graz (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 15/587,744

(22) Filed: May 5, 2017

(65) Prior Publication Data
US 2017/0244922 A1    Aug. 24, 2017

Related U.S. Application Data

(63) Continuation of application No. 13/686,993, filed on Nov. 28, 2012, now Pat. No. 9,648,263.

(51) Int. Cl.
| | |
|---|---|
| *H04N 5/369* | (2011.01) |
| *H04N 5/3745* | (2011.01) |
| *G06T 7/521* | (2017.01) |

(52) U.S. Cl.
CPC .......... *H04N 5/3745* (2013.01); *G06T 7/521* (2017.01)

(58) Field of Classification Search
CPC .......... G01S 7/4913; G06T 7/521; H02J 7/00; H04N 5/3698; H04N 5/3745
USPC .......................... 327/509, 518, 595; 320/166
See application file for complete search history.

(56) References Cited

U.S. PATENT DOCUMENTS

| | | | |
|---|---|---|---|
| 7,268,814 B1 | 9/2007 | Pain et al. | |
| 9,648,263 B2 | 5/2017 | Dielacher et al. | |
| 9,756,271 B2 * | 9/2017 | Luo ................... | H04N 5/37452 |
| 2006/0022928 A1 | 2/2006 | Kim et al. | |
| 2007/0052644 A1 * | 3/2007 | Uchino ................ | G09G 3/3233 345/92 |
| 2011/0260038 A1 | 10/2011 | Hirotsu et al. | |
| 2016/0007011 A1 * | 1/2016 | Nonaka .............. | H04N 13/0454 348/59 |
| 2017/0018221 A1 * | 1/2017 | Hung ....................... | G09G 3/20 |

* cited by examiner

*Primary Examiner* — William Hernandez
(74) *Attorney, Agent, or Firm* — Harrity & Harrity, LLP

(57) ABSTRACT

Representative implementations of devices and techniques provide conservation of charge in a pixel. Charge in the pixel may be alternately stored in a first gate capacitance of the pixel and a second gate capacitance of the pixel. Transferring the charge between the gate capacitances conserves some or all of the charge, and reduces input power used to charge the gate capacitances.

14 Claims, 6 Drawing Sheets

CHARGE CONSERVATION IN PIXELS

RELATED APPLICATION

This application is a continuation of U.S. patent application Ser. No. 13/686,993, filed Nov. 28, 2012 (now U.S. Pat. No. 9,648,263), the disclosure of which is incorporated herein by reference.

BACKGROUND

Time-of-Flight cameras, for example, may use pixels to measure the time-of-flight of a light signal as it travels between the camera and an object, to determine a distance of the object from the camera. Multiple pixels may also be used, where light signals associated with individual pixels may provide distance measurements for discrete points on the object, forming a three-dimensional "distance image." This can be made possible by detecting differences in the delays associated with reflected light signals off of the discrete points, for example.

Pixels can be constricted of semiconductor materials (such as silicon, germanium, indium gallium arsenide, lead sulfide, etc.), and may generate a current or voltage when exposed to a light signal. Pixels may also include capacitances (e.g., parasitic capacitances, gate capacitances, etc.) that are charged and discharged with operation of the pixel. In some cases, a pixel may be coupled to at least a pair of voltage potentials, or a voltage source and ground, for example. During operation, the capacitances may alternately charge by being coupled to a higher of the voltage potentials and discharge by being coupled to a lower of the voltage potentials. In many cases, this can result in considerable power consumption or waste, particularly as the frequency of charging/discharging increases. This may be more evident, for example, in cases where a charged capacitance is discharged to ground. Further, with an array of multiple pixels, the power consumption can be multiplied.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For this discussion, the devices and systems illustrated in the figures are shown as having a multiplicity of components. Various implementations of devices and/or systems, as described herein, may include fewer components and remain within the scope of the disclosure. Alternately, other implementations of devices and/or systems may include additional components, or various combinations of the described components, and remain within the scope of the disclosure.

DETAILED DESCRIPTION

Overview

Figure 1:
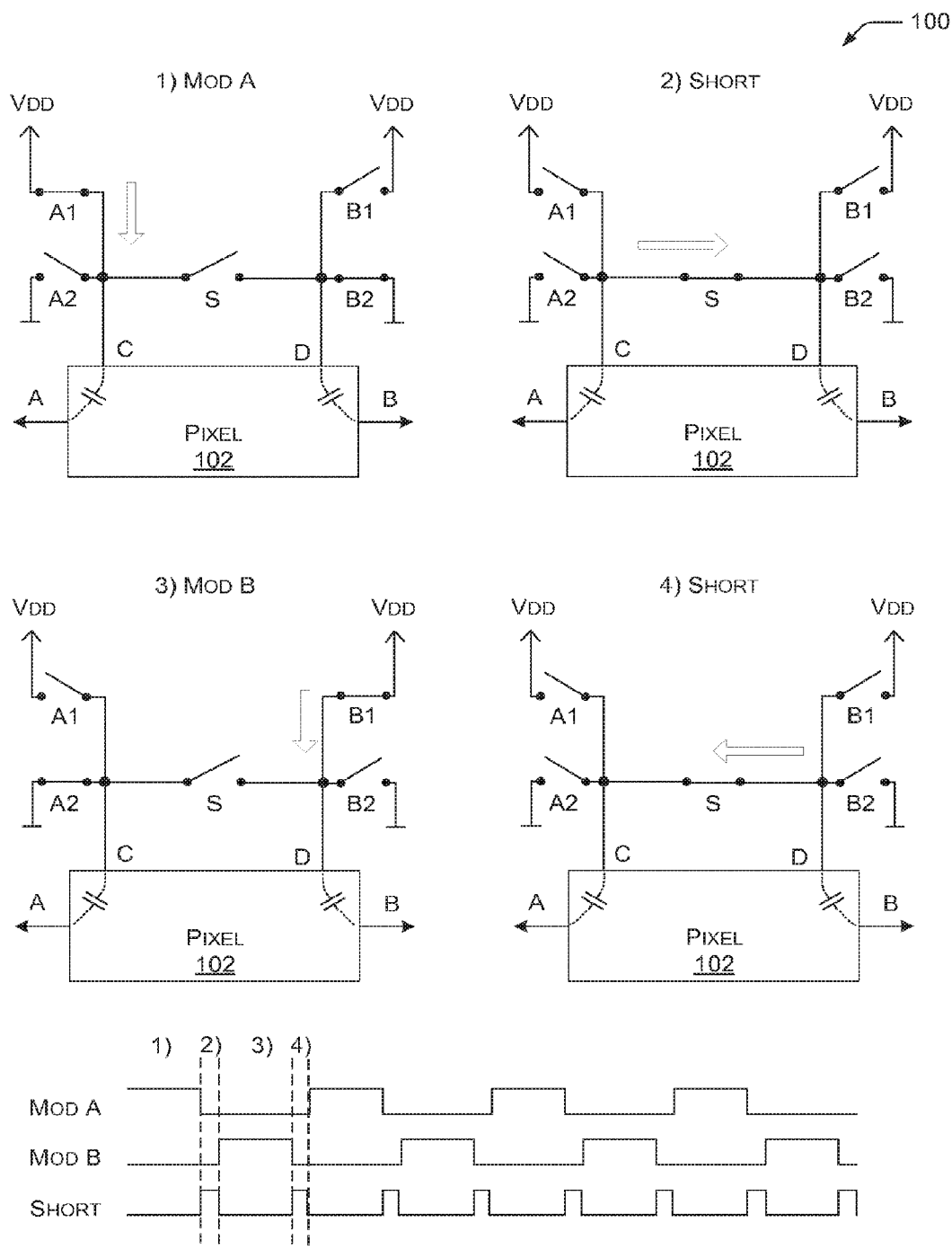
FIG. 1 is a set of schematic drawings of a pixel with control switches shown in four states, representing four stages of operation, according to an implementation. A signal diagram for control signals and their relative timing is also shown in the lower portion of the drawing.

In distance measurement applications, or the like, one or more electrical modulation signals (i.e., control signals) may be applied to a pixel and be correlated with an optical signal associated with the pixel to calculate the distance of an object. The control signals may control the tuning of the charging and discharging of the gate capacitances of the pixel, for example. Further, control signals may be used to conserve charge, and thereby reduce power consumption of the pixel (or an array of pixels, for example).

Representative implementations of devices and techniques provide conservation of charge in a pixel. Charge in the pixel may be alternately stored in a first gate capacitance of the pixel and a second gate capacitance the pixel during operation of the pixel. For example, solve or all of the charge stored in one gate capacitance may be transferred to the other gate capacitance during operation. In one example, charge is transferred back and forth between the gate capacitances continuously. Transferring the charge between the gate capacitances conserves some or all of the charge, and reduces the amount of input power used to charge the gate capacitances.

In various implementations, control signals are used in conjunction with one or more switches, or other electrical components (e.g., diodes, etc.) to transfer charge between capacitances of a pixel. For example, in one implementation, one or more switches are used to short gate capacitances together for a predetermined period of time, allowing a transfer of charge. In another implementation, a resonant circuit is formed using an inductance. The resonant circuit provides continuous charge transfer between capacitances.

Various implementations and arrangements for an electrical circuit including a pixel are discussed in this disclosure. Techniques and devices are discussed with reference to example semiconductor-based pixel devices. However, this is not intended to be limiting, and is for ease of discussion and illustrative convenience. The techniques and devices discussed may be applied to any of various photo sensitive device designs, structures, and the like (e.g., transistors, diodes, diode-like devices, optical devices, light-sensitive elements or components, etc.), and remain within the scope of the disclosure.

Implementations are explained in more detail below using a plurality of examples. Although various implementations and examples are discussed here and below, further implementations and examples may be possible by combining the features and elements of individual implementations and examples.

Example Pixel Circuits

In various implementations, a pixel may be arranged with one or more electrical components (e.g., switches, inductances, diodes, etc.) in a circuit, such that during operation of the pixel, charge is conserved, and power consumption is reduced. For example, during operation, the pixel may charge and discharge gate capacitances of the pixel. A circuit may be arranged to allow charge discharged from a first capacitance to flow to a second capacitance, at least partially charging the second capacitance. Thus, power consumption is reduced by conserving the charge.

Figure 2:
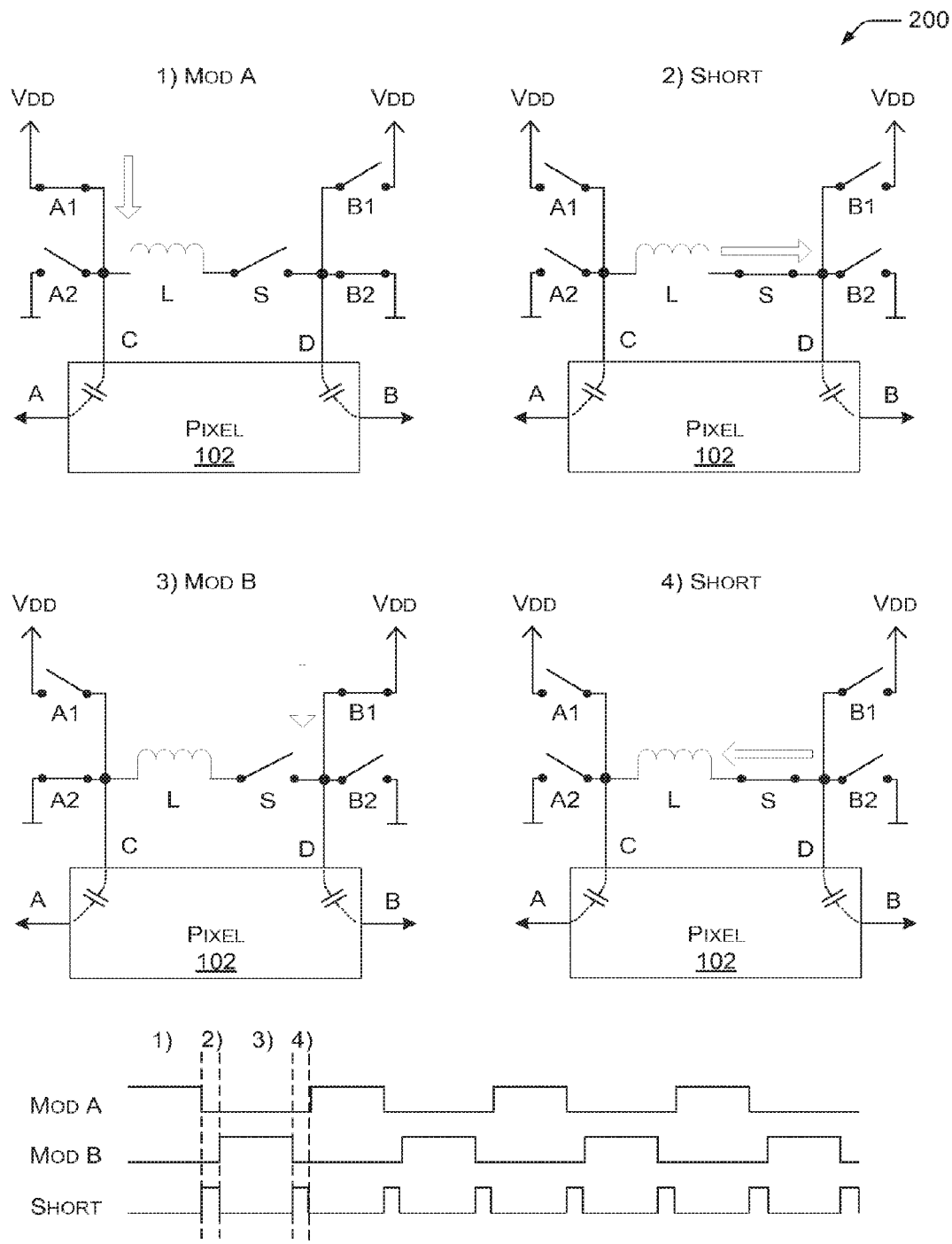
FIG. 2 is a set of schematic drawings of the pixel of FIG. 1 including an inductance, with control switches shown in four states, representing four stages of operation, according to another implementation. A signal diagram for control signals and their relative timing is also shown in the lower portion of the drawing.
Figure 3:
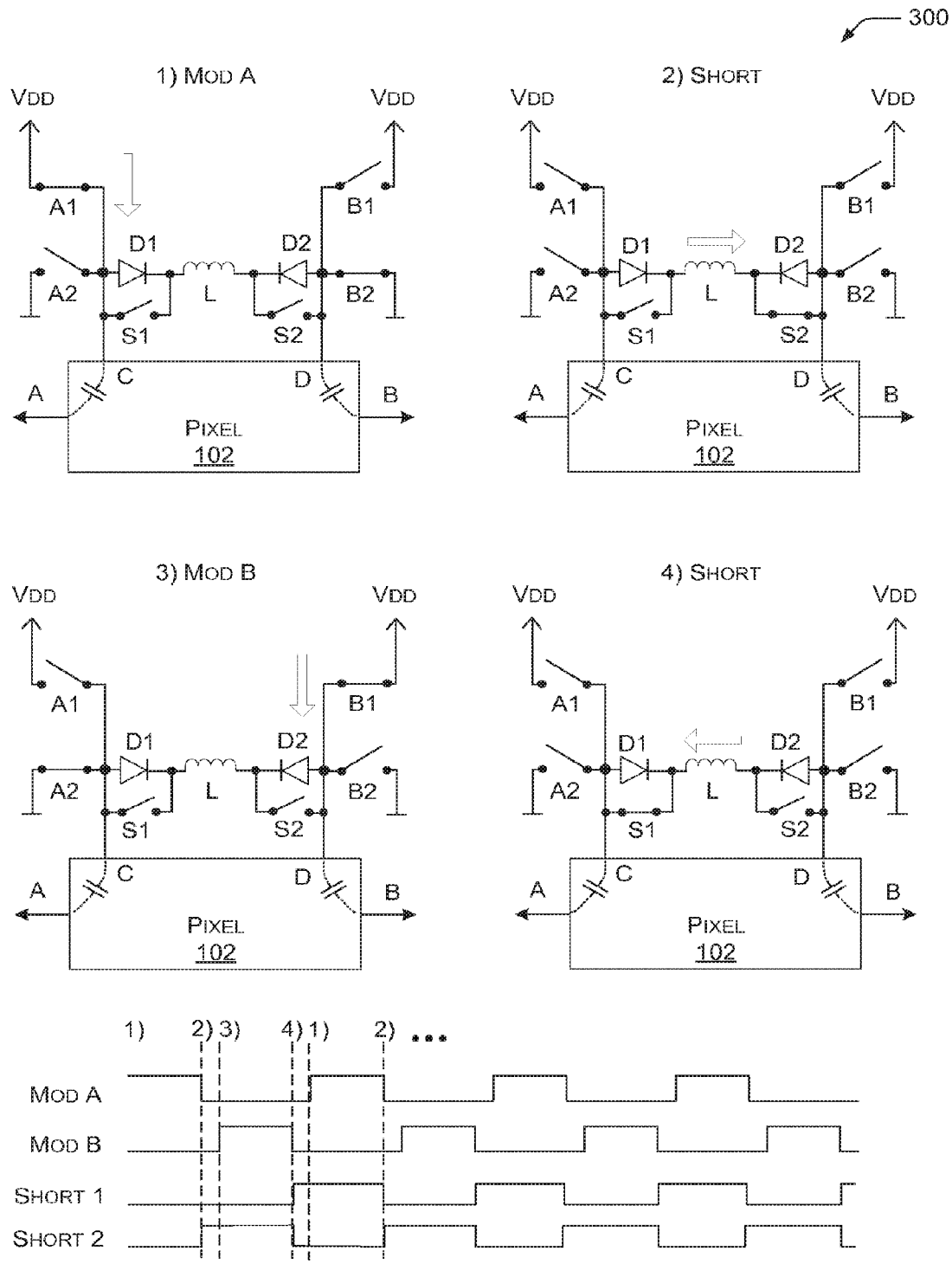
FIG. 3 is a set of schematic drawings of the pixel of FIG. 1 including an inductance and diodes, with control switches shown in four states, representing four stages of operation, according to a further implementation. A signal diagram for control signals and their relative timing is also shown in the lower portion of the drawing.

FIGS. 1-3 show sets of schematic drawings of circuit arrangements (100, 200, 300) including a pixel 102, where the circuit (100, 200, 300) is arranged to conserve charge in the pixel 102 during operation of the pixel 102. Each of the figures (FIGS. 1-3) illustrates a different example implementation. The implementations in the figures (FIGS. 1-3) are not intended to be limiting, but are for ease of discussion. Alternate arrangements of the illustrated implementations (including with alternate designs, components, etc.) are the scope of the disclosure. In various implementations, a circuit (100, 200, 300) may include any number of components. For example, the circuit (100, 200, 300) is described throughout as having two gate capacitances (a first and a second gate capacitance). This is not intended to be limiting, and alternate implementations of a circuit (100, 200, 300) may have a greater number of gate capacitances, with the corresponding number of switches, inductors, diodes, or other associated components.

In further implementations, a circuit (100, 200, 300) may include additional devices, circuits, structures, and the like. Further, in alternate implementations, other arrangements including one or more pixels 102 along with one or more electrical components are also within the scope of the disclosure. Multiple arrangements of pixels 102 (e.g., arrays, matrices, pluralities, etc.) in similar circuits are also included within the scope of the disclosure. The use of the singular "pixel 102" is intended to include multiple pixels 102, and discussion of a circuit (100, 200, 300) is intended to include multiple like circuits.

The techniques, components, and devices described herein with respect to the circuit (100, 200, 300) are not limited to the illustrations in FIGS. 1-3, and may be applied to other circuit designs without departing from the scope of the disclosure. In some cases, additional or alternative components may be used to implement the techniques described herein.

Example Implementations and Operation

In various implementations, as shown in FIGS. 1-3, a circuit (100, 200, 300) is arranged with one or more pixels 102. The pixel 102 is illustrated as having two terminals (A and B) and two gate terminals (C and D). In alternate implementations, the pixel 102 may have additional or alternate terminals and/or gate terminals.

Also, as shown in FIGS. 1-3, the pixel 102 has a first gate capacitance AC between the terminal A and the gate terminal C, and a second gate capacitance BD between the terminal B and the gate terminal D. In various implementations, the gate capacitances AC and BD are parasitic gate-oxide capacitances of the pixel device 102, or the like. In alternate implementations, the gate capacitances AC and BD may be provided by capacitive components, elements, portions, or the like, that are produced as part of the pixel 102, or added to the pixel 102 or the circuit 100. In alternate implementations, the pixel 102 may have additional or alternate capacitances than those shown in FIGS. 1-3. For example, the capacitances may additionally or alternately be between gate terminal C and ground, gate terminal D and ground, or any other parasitic capacitance, where the capacitance is associated with one portion (the AC side, for example) or another portion (the BD side, for example) of the pixel 102. In some implementations, the capacitances of a pixel 102 will include a combination of different parasitic capacitances. Accordingly, reference to a "gate capacitance" in this disclosure includes additional and/or alternate capacitances, including combinations of capacitances, with reference to respective portions (AC or BD, for example) of the pixel 102.

In various implementations, as shown in FIGS. 1-3, a circuit (100, 200, 300) may include one or more switches (A1, B1) arranged to couple the gate capacitances AC and BD to a higher potential (shown as VDD in FIGS. 1-3) to charge the gate capacitances (AC and BD) and one or more switches (A2, B2) arranged to couple the gate capacitances AC and BD to a lower potential (shown as a ground in FIGS. 1-3) to discharge the gate capacitances AC and BD. In alternate implementations, the lower potential be a lower potential than the VDD potential, for example, and may not necessarily be a ground potential.

In various alternate implementations, other switch arrangements may be used in a circuit (100, 200, 300). For example, in an implementation, the switches A1, A2 may be combined, for example, to a single multi-pole switch and the switches B1, B2 may be combined, for example, to another single multi-pole switch. In further implementations, fewer, additional, or alternate switches may be used in a circuit (100, 200, 300) to perform the techniques and processes described herein.

In various implementations, the operation of a circuit (100, 200, 300) may be described in terms of multiple stages of operation ("stages"). For example, events occurring during the operation of the circuit (100, 200, 300) may be described as occurring during a stage. This is for ease of discussion only, and not intended to be limiting. Various described events, etc. may occur in alternate stages than those described, or may occur in a different order than described. For the purposes of this discussion, the stages described are repeated (i.e., continuous, etc.) during operation of the pixel 102 and/or circuit (100, 200, 300).

FIGS. 1-3 illustrate a set of four schematic drawings of the circuits 100, 200, and 300 in four states, representing four stages of operation, according to various implementations. A signal diagram showing control signals (mod A, mod B, and short) and their relative timing is also shown in the lower portion of the drawings of FIGS. 1-3. In various implementations, the control signals (mod A, mod B, and short) control switching of various switches in the circuits 100, 200, and 300 during the stages of operation.

Referring to FIGS. 1-3, the first stage of operation includes: 1) Mod A, wherein the first gate capacitance AC is electrically coupled to the higher voltage potential (e.g., VDD) through switch A1, and is charged (current flow is indicated by the arrow) while the second gate capacitance BD is electrically coupled to the lower voltage potential (e.g., ground) through switch B2, and is discharged. In an alternate implementation, gate capacitance AC has been charged or partially charged in a previous stage, and so is held at the charged state or is fully charged when gate capacitance AC is coupled to the higher voltage potential (e.g., VDD). Accordingly, in the alternate implementation, gate capacitance BD has been discharged or partially discharged in a previous stage, and so is held at the discharged state or is fully discharged when gate capacitance BD is coupled to the lower voltage potential (e.g., ground).

During the first stage, the control signal mod A is high and the control signal mod B is low, as shown in FIGS. 1-3. Based on the control signals (mod A and mod B) switch A1 is closed, switch A2 is open, switch B1 is open, and switch B2 is closed. Thus, in an implementation, when a control signal (mod A or mod B) is high, the corresponding gate capacitance (AC or BD, respectively) is coupled to the higher voltage potential (e.g., VDD), and the opposite gate capacitance (BD or AC, respectively) is coupled to the lower voltage potential (e.g., ground, or VSS at a lower potential than VDD). In the implementation, both control signals (mod A and mod B) are not allowed to be high simultaneously.

Referring again to FIGS. 1-3, the second stage of operation includes: 2) Short, wherein the first gate capacitance AC is electrically coupled to the second gate capacitance BD. This may be accomplished using various techniques and devices, as illustrated in the implementations of FIGS. 1-3, and will be discussed further below. During the second stage, the fully charged first gate capacitance AC is discharged or partially discharged to the second gate capacitance BD, charging or partially charging gate capacitance BD (current flow is indicated by the arrow).

During the second stage, both of the control signals mod A and mod B may be low, as shown in FIGS. 1-3. Based on the control signals (mod A and mod B) switch A1 is open, switch A2 is open, switch B1 is open, and switch B2 is open.

Referring again to FIGS. 1-3, the third stage of operation includes: 3) Mod B, wherein the first gate capacitance AC is electrically coupled to the lower voltage potential (e.g., ground) through switch A2, and is discharged while the second gate capacitance BD is electrically coupled to the higher voltage potential (e.g., VDD) through switch B1, and is charged (current flow is indicated by the arrow). In an alternate implementation, gate capacitance BD has been charged or partially charged in a previous stage (e.g., the second stage), and so is held at the charged state or is fully charged when gate capacitance BD is coupled to the higher voltage potential (e.g., VDD). Accordingly, in the alternate implementation, gate capacitance AC has been discharged or partially discharged in a previous stage (e.g., the second stage), and so is held at the discharged state or is fully discharged when gate capacitance AC is coupled to the lower voltage potential (e.g., ground).

During the third stage, the control signal mod A is low and the control signal mod B is high, as shown in FIGS. 1-3. Based on the control signals (mod A and mod B) switch A1 is open, switch A2 is closed, switch B1 is closed, and switch B2 is open.

Referring again to FIGS. 1-3, the fourth stage of operation includes: 4) Short, wherein the second gate capacitance BD is electrically coupled to the first gate capacitance AC. This may be accomplished using various techniques and devices, as illustrated in the implementations of FIGS. 1-3, and will be discussed further below. During the fourth stage, the fully charged second gate capacitance BD is discharged or partially discharged to the first gate capacitance AC, charging or partially charging gate capacitance AC (current flow is indicated by the arrow).

During the fourth stage, both of the control signals mod A and mod B may be low, as shown in FIGS. 1-3. Based on the control signals (mod A and mod B) switch A1 is open, switch A2 is open, switch B1 is open, and switch B2 is open.

As mentioned above, in various implementations, the stages repeat, starting again at the first stage of operation. In an implementation, the stages continue to cycle through the stages as described while the pixel 102 is in operation. In alternate implementations, fewer, additional, or alternate stages of operation may be included.

In an implementation, as shown in FIGS. 1 and 2, a circuit 100 or 200 includes a switch S arranged to electrically couple the first gate capacitance AC to the second gate capacitance BD. For example, the switch S may couple the first gate capacitance AC to the second gate capacitance BD during one or both of the second and fourth stages of operation. The switch S shorts the first gate terminal C to the second gate terminal D, and allows the first gate capacitance AC or the second gate capacitance BD to discharge stored charge to the other gate capacitance (BD or AC, respectively).

In an implementation, the switch S is arranged to couple the first gate terminal C to the second gate terminal D and to allow a charge to shift from one of the first and second gate capacitances (AC and BD) to the other of the first and second gate capacitances (BD and AC) without a substantial loss of the charge. Accordingly, some charge is conserved, and power consumption of the pixel 102 may be reduced.

In one implementation, a charge is distributed substantially equally between the first and second gate capacitances when the switch S is closed (e.g., during the second or fourth stages of operation). For example, when the first gate capacitance is shorted to the second gate capacitance by closing switch S, the charge stored on one of the gate capacitances is discharged to the other of the gate capacitances, to the point where the two gate capacitances have substantially equal charge.

In an implementation, the switch S is arranged to toggle based on the control signal "Short," as shown in FIGS. 1-3. As shown in FIGS. 1-3, the control signal Short may be high when the control signals mod A and mod B are both low. Thus, the switch S is closed when the switches A1, A2, B1, and B2 are open. This timing ensures that the switch S does not short the higher voltage source (e.g., VDD) to the lower voltage potential or to ground. Thus, the high signal pulses from the control signal Short may be any duration that is within the time frame comprising both mod A and mod B being in a low state. In an alternate implementation, as shown in FIG. 3, the control signal Short (e.g., Short 1 or Short 2) may remain high, and the corresponding switch (e.g., S1 or S2) may remain closed, even if mod A or mod B respectively changes from low to high, starting the next phase. In the implementation, the opposite diode (e.g., D2 or D1, respectively) can prevent the charge from being shifted back out of sequence. This is reflected in the relaxed timing diagram of FIG. 3, for example.

In an implementation, the switch S is arranged to toggle at a rate having a higher frequency than a modulation frequency of the pixel 102 (i.e., higher than the rate of control signals mod A and mod B). In alternate implementations, the switch S is arranged to toggle at a modulation frequency of the pixel 102, or at another predetermined frequency (e.g., a multiple of the modulation frequency, etc.).

In another implementation, as shown in FIGS. 2 and 3, a circuit (200, 300) includes an inductance L arranged to shift a charge from one of the first and second gate capacitances (AC and BD) to another of the first and second gate capacitances (BD and AC) without a substantial loss of the charge. For example, in one implementation, the inductance L provides for most or all of the charge is transferred from one gate capacitance (AC, BD) to the other gate capacitance (BD, AC) during the second and fourth stages of operation. In such implementations, the power consumption of the pixel may be lower than in the circuit 100 of FIG. 1, for example. This is because little to no additional charging is needed at the gate capacitances AC and BD with each cycle, since a majority (if not all) of the charge is conserved based on the charge transfers during the second and fourth stages.

In one implementation, the circuit (200, 300) comprises a resonant circuit the charge oscillates between the first gate capacitance AC and the second gate capacitance BD substantially continuously. In an implementation, the switch S is arranged to toggle at a rate having a higher frequency than a modulation frequency of the pixel 102 (i.e., higher than the rate of control signals mod A and mod B), and the rate is based on the first and second gate capacitances (AC and BD) and the inductance L.

Figure 4:
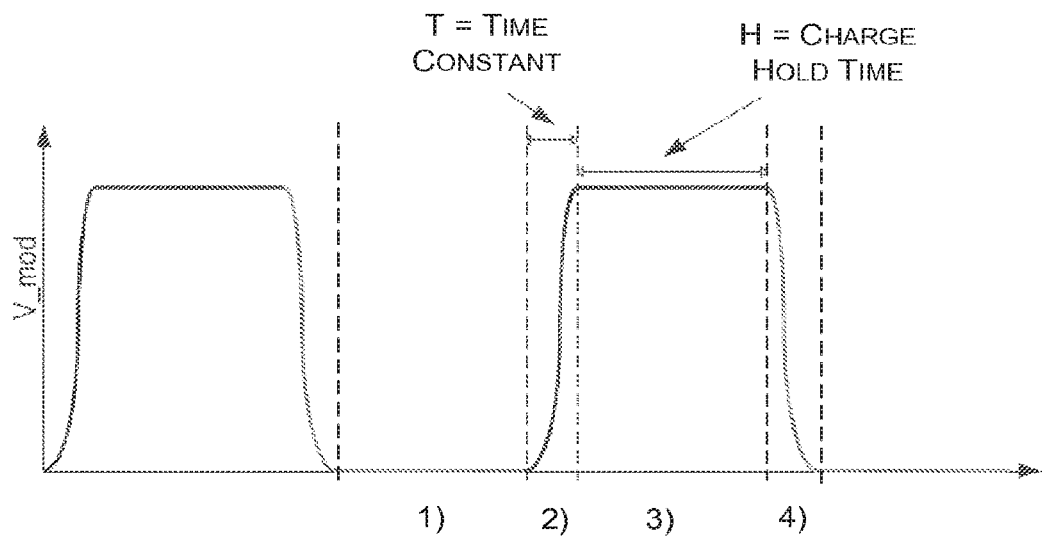
FIG. 4 is a signal diagram of a periodic control signal, illustrating a dependence of capacitance and inductance values to a time constant, according to an implementation.

For example, as shown in the signal diagram of FIG. 4, the shorting phase (e.g., the duration of the pulse of control signal Short) may be determined optimally by the time constant T, which is relative to the inductance L and the gate capacitances AC and BD. The charge may be held by one of the gate capacitances AC and BD at stages 1 and 3 for a duration based on the timing of one or more components, such as switches A1, A2, B1, B2, and 5, for example.

In another implementation, as shown in FIG. 3, the circuit 300 includes one or more diodes (D1, D2) arranged to allow a charge to shift from one of the first and second gate capacitances (AC and BD) to the other of the first and second gate capacitances (BD and AC) via the inductance L. In one implementation, as shown in FIG. 3, the circuit 300 also includes switches S1 and S2 arranged to short the diodes D1 and D2 during the fourth and second stages, respectively.

For example, during the first and third stages, the switches S1 and S2 are open, and so the diodes D1 and D2 hold the charge at one of the gate capacitances AC and BD. However, during the second stage, for example, the switch S2 closes, shorting the diode D2, and allowing a charge stored at gate capacitance AC to be transferred through forward biased diode D1 and inductance L, to gate capacitance BD through switch S2. Further, during the fourth stage, for example, the switch S1 closes, shorting the diode D1, and allowing a charge stored at gate capacitance BD to be transferred through forward biased diode D2 and inductance L, to gate capacitance AC through switch S1.

In an implementation, the operation of switches S1 and S2 may be controlled by one or more control signals such as control signals Short 1 and Short 2, for example. In various implementations, the control signals Short 1 and Short 2 may have a frequency that is a fraction of the modulation frequency of the pixel 102 (e.g., a fraction of the frequency of mod A and mod B), or another predetermined frequency. As mentioned above, the pulse of control signals Short 1 and Short 2 may have a duration that is based on the inductance L and the gate capacitances AC and BD, for example.

In various implementations, one or more of the switches (A1, A2, B1, B2, S, S1, and S2) may be implemented using switching devices such as transistors, or the like. In various implementations, circuits 100, 200, and 300 may be implemented with fewer, additional, or alternative components and/or elements, and remain within the scope of the disclosure. Further, the circuits 100, 200, and 300 may be implemented with alternative circuit designs or types that combine or reorganize components or elements, and/or their functions.

Representative Processes

Figure 5:
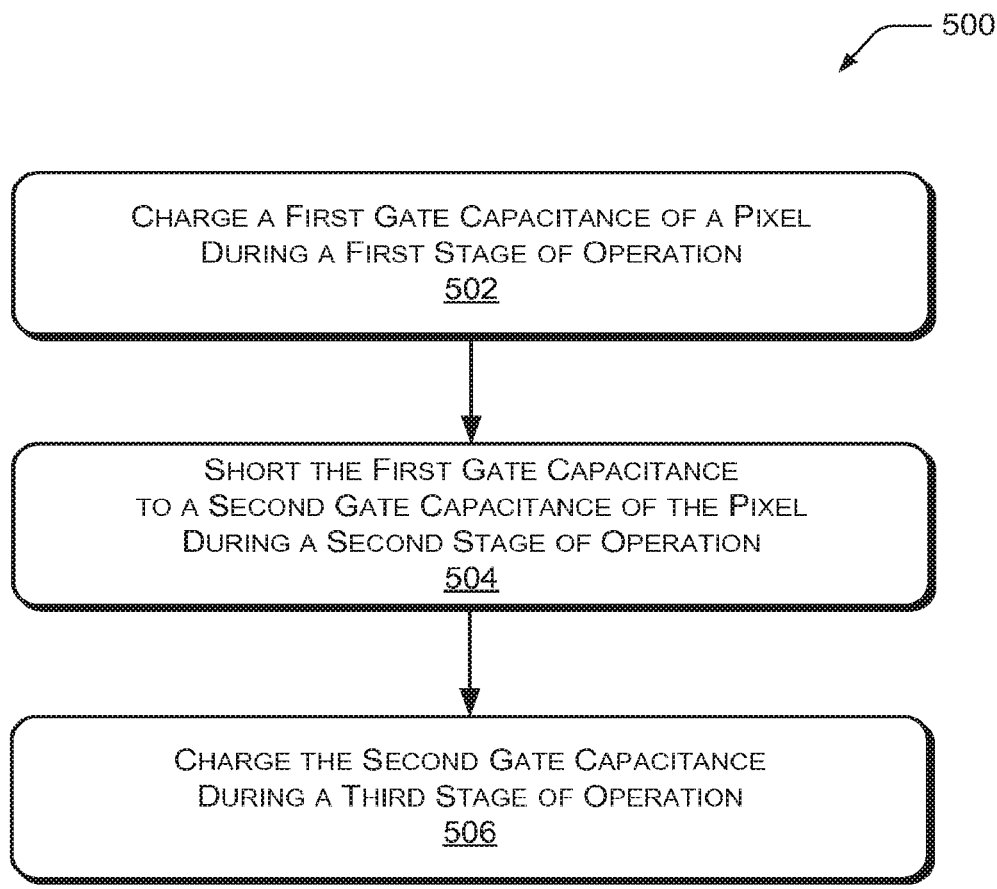
FIG. 5 is a flow diagram illustrating an example process for conserving charge in a pixel, according to an implementation.
Figure 6:
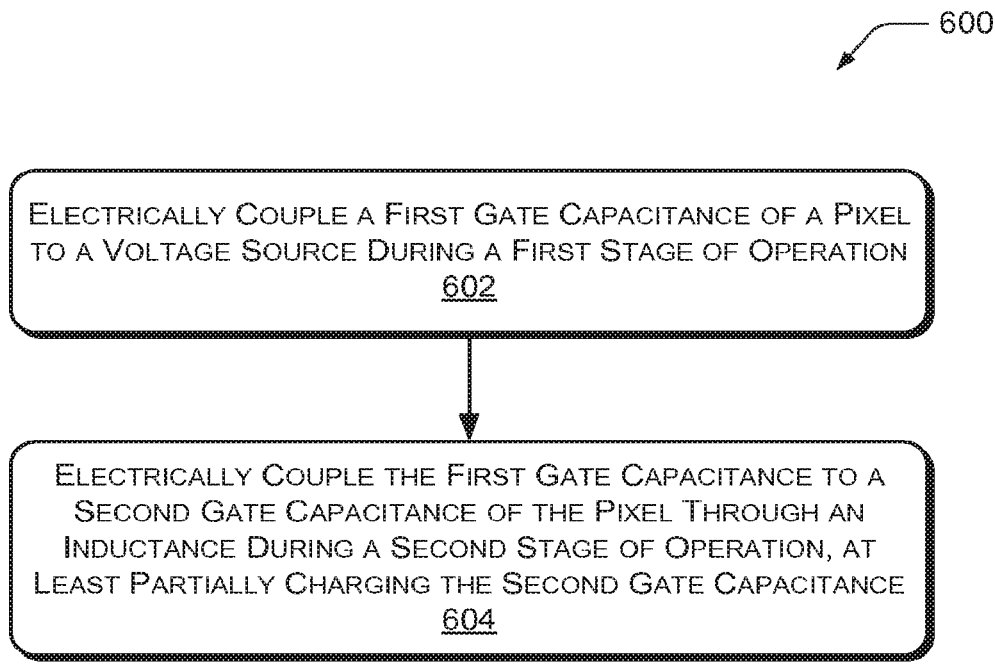
FIG. 6 is a flow diagram illustrating another example process for conserving charge in a pixel using an inductance, according to an implementation.

FIGS. 5 and 6 illustrate representative processes 500 and 600 for conserving a charge in a pixel (such as pixel 102, for example). In various implementations, the pixel may be arranged in a circuit (such as circuit 100, 200, 300, for example) with one or more other components. In various implementations, the components may include one or more of switches, inductances, diodes, and the like. The processes 500 and 600 are also described with reference to FIGS. 1-4.

The order in which the processes are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented in any suitable materials, or combinations thereof, without departing from the scope of the subject matter described herein.

Referring to FIG. 5, at block 502, the process 500 includes charging a first gate capacitance (such as gate capacitance AC, for example) of a pixel (such as pixel 102, for example) during a first stage of operation. In an alternate implementation, the first gate capacitance may have been charged or partially charged in a previous stage, and so is held at the charged state during the first stage.

At block 504, the process 500 includes shorting the first gate capacitance to a second gate capacitance (such as gate capacitance BD, for example) of the pixel during a second stage of operation. In an implementation, the shorting at least partially charges the second gate capacitance. In some implementations, the second gate capacitance is approximately fully charged, or nearly fully charged during the second stage.

At block 506, the process 500 includes charging the second gate capacitance during a third stage of operation. In an alternate implementation, the second gate capacitance may have been charged or partially charged during the second stage, and so is held at the charged state during the third stage.

In an implementation, the process 500 includes shorting the second gate capacitance to the first gate capacitance during a fourth stage of operation, the shorting at least partially charging the first gate capacitance. In some implementations, the first gate capacitance is approximately fully charged, or nearly fully charged during the fourth stage.

In various implementations, the process repeats the first through fourth stages continuously while the pixel is in operation.

In an implementation, the process 500 includes distributing a charge substantially equally between the first and second gate capacitances during at least one of the second and fourth stages of operation. For example, when the first gate capacitance is shorted to the second gate capacitance, the charge stored on one of the gate capacitances is discharged to the other of the gate capacitances, to the point where the two gate capacitances have a substantially equal charge. At this point of substantial equilibrium, the two gate capacitances have substantially equal stored charges.

In an implementation, the process 500 includes discharging the first gate capacitance while charging the second gate capacitance and/or discharging the second gate capacitance while charging the first gate capacitance. In another implementation, the process 500 includes charging the first gate capacitance based on a first control signal (such as mod A, for example) and charging the second gate capacitance based on a second control signal (such as mod B, for example). In an implementation, at least one of the first and second control signals comprises a periodic and/or a modulated signal. In various implementations, the control signals may originate or be provided by a control module such as a group of logic devices, a signal processor, a computational processor, an on-chip generator, or the like.

In an implementation, the process 500 includes shorting the first gate capacitance to the second gate capacitance based on a third control signal (such as Short, Short 1, and Short 2, for example). In one implementation, the third control signal is allowed to have a high state when the first and second control signals are both in a low state.

In one implementation, the process 500 includes the use of inductances, diodes, switches, and the like, as described above, to hold a charge on a gate capacitance and to transfer charge between gate capacitances.

In an implementation, the process 500 includes calculating a distance of an object from the pixel based on the first and/or second control signals. For example, the first and second control signals may be correlated with an optical signal used by the pixel to determine the distance of the pixel from the object, the pixel generating a voltage or a current based on the received/reflected optical signal, for example.

In an alternate implementation, the process 500 includes charging a plurality of first and second gate capacitances of an array of pixels based on the first and second control signals. For example, a three-dimensional imaging device, or a similar device may use a plurality of pixels arranged in an array, a matrix, or the like. The plurality of pixels can have a plurality of first and second gate capacitances, where the plurality of first gate capacitances are charged based on the first control signal and the plurality of second gate capacitances are charged based on the second control signal.

Referring to FIG. 6, at block 602, the process 600 includes electrically coupling a first gate capacitance (such as gate capacitance AC, for example) of a pixel (such as pixel 102, for example) to a voltage source (such as VDD, for example) during a first stage of operation.

At block 604, the process 600 includes electrically coupling the first gate capacitance to a second gate capacitance (such as gate capacitance BD, for example) of the pixel through an inductance (such as inductance L, for example) during a second stage of operation. In an implementation, the coupling at least partially charges the second gate capacitance. In an implementation, the process 600 includes decoupling the first gate capacitance from the voltage source prior to electrically coupling the first gate capacitance to the second gate capacitance.

In one implementation, the process 600 includes the use of diodes and switches, as described above, to hold a charge on a gate capacitance and to transfer charge between gate capacitances.

In an implementation, the process 600 includes discharging the first gate capacitance approximately fully and charging the second gate capacitance approximately fully during the second stage of operation. In another implementation, the process 600 includes coupling the first gate capacitance of the pixel to a voltage source and coupling the first gate capacitance to the second gate capacitance based on one or more control signals.

In an implementation, the process 600 includes electrically coupling the second gate capacitance to the voltage source during a third stage of operation. In one implementation, the process 600 includes electrically coupling the first gate capacitance to a voltage sink (such as a lower potential or ground, for example) while electrically coupling the second gate capacitance to the voltage source.

In an implementation, the process 600 includes electrically coupling the second gate capacitance to the first gate capacitance through the inductance during a fourth stage of operation, the coupling at least partially charging the first gate capacitance.

In an implementation, the process 600 includes alternately shifting a charge between the first and second gate capacitances during the second and fourth stages of operation, the charge oscillating between the first and second gate capacitances. In the implementation, the process includes forming at least a portion of a resonant circuit using the pixel and the inductance.

In alternate implementations, other techniques may be included in the processes 500 and/or 600 in various combinations, and remain within the scope of the disclosure.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing example devices and techniques.

What is claimed is:

1. A time of flight camera, comprising:
    a time of flight pixel having a first gate terminal and a second gate terminal to provide modulation signals for the time of flight pixel;
    a first gate capacitance and a second gate capacitance associated with the first gate terminal and the second gate terminal;
    one or more first electrical components arranged to couple the first gate terminal to a first potential; and
    one or more second electrical components arranged to transfer charge between the first gate capacitance and the second gate capacitance.

2. The time of flight camera of claim 1, where the first gate capacitance and the second gate capacitance are parasitic gate-oxide capacitances.

3. The time of flight camera of claim 1, where the time of flight pixel is constructed of a semiconductor material.

4. The time of flight camera of claim 1, where the time of flight pixel generates at least one of a current or a voltage when exposed to a light signal.

5. The time of flight camera of claim 1, further comprising:
    an inductance arranged to shift a charge from one of the first gate capacitance or the second gate capacitance to the other of the first gate capacitance or the second gate capacitance without a substantial loss of the charge.

6. The time of flight camera of claim 5, where the charge oscillates between the first gate capacitance and the second gate capacitance.

7. The time of flight camera of claim 5, further comprising:
    one or more diodes arranged to allow the charge to shift from one of the first gate capacitance or the second gate capacitance to the other of the first gate capacitance or the second gate capacitance via the inductance.

8. The time of flight camera of claim 1, where the one or more first electrical components are arranged to couple the first gate terminal to a second potential.

9. The time of flight camera of claim 8, where the second potential is a ground potential.

10. The time of flight camera of claim 8, where the second potential is higher than a ground potential.

11. The time of flight camera of claim 1, where the one or more first electrical components include:
   a first switch arranged to couple the first gate capacitance to the first potential, and
   a second switch arranged to couple the second gate capacitance to the first potential.

12. The time of flight camera of claim 11, where the one or more second electrical components include:
   a third switch arranged to couple the first gate capacitance to a second potential, and
   a fourth switch arranged to couple the second gate capacitance to the second potential.

13. The time of flight camera of claim 1, where the one or more first electrical components and the one or more second electrical components share a single multi-pole switch that connects the first gate capacitance to the first potential and a second potential.

14. The time of flight camera of claim 13, where the one or more first electrical components and the one or more second electrical components share another single multi-pole switch that connects the second gate capacitance to the first potential and the second potential.

\* \* \* \* \*